(12) United States Patent
DuHadway et al.

(10) Patent No.: US 9,562,778 B2
(45) Date of Patent: Feb. 7, 2017

(54) COMBINED RADAR AND GPS LOCALIZATION SYSTEM

(75) Inventors: Charles DuHadway, Sunnyvale, CA (US); Jan Becker, Palo Alto, CA (US); Benjamin Pitzer, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 1137 days.

(21) Appl. No.: 13/153,137

(22) Filed: Jun. 3, 2011
(Under 37 CFR 1.47)

(65) Prior Publication Data

US 2012/0310504 A1    Dec. 6, 2012

(51) Int. Cl.
| | | |
|---|---|---|
| G01C 21/30 | (2006.01) | |
| G01C 21/28 | (2006.01) | |
| G01S 19/45 | (2010.01) | |
| G01S 5/02  | (2010.01) | |
| G01S 13/86 | (2006.01) | |

(52) U.S. Cl.
CPC ............. *G01C 21/28* (2013.01); *G01S 5/0278* (2013.01); *G01S 13/86* (2013.01); *G01S 19/45* (2013.01)

(58) Field of Classification Search
CPC ......... G01C 21/28; G01S 19/45; G01S 5/0278
USPC .............. 701/117, 93, 24, 26, 300, 36, 408, 411,701/414, 432, 438, 445, 446, 532, 533; 340/435, 436, 438, 904; 342/173, 357.23, 342/357.25, 357.28, 357.32, 70; 382/104
See application file for complete search history.

(56) References Cited

U.S. PATENT DOCUMENTS

| | | | |
|---|---|---|---|
| 6,675,081 B2 | 1/2004 | Shuman et al. | |
| 6,768,944 B2 | 7/2004 | Breed et al. | |
| 7,102,496 B1 * | 9/2006 | Ernst et al. | 340/436 |
| 2007/0208507 A1 * | 9/2007 | Gotoh | 701/210 |
| 2008/0175012 A1 | 7/2008 | Shimaoka et al. | |
| 2008/0243378 A1 | 10/2008 | Zavoli | |
| 2009/0067675 A1 * | 3/2009 | Tan et al. | 382/104 |
| 2009/0174540 A1 | 7/2009 | Smith | |
| 2009/0228204 A1 * | 9/2009 | Zavoli et al. | 701/208 |
| 2010/0256835 A1 | 10/2010 | Mudalige | |

FOREIGN PATENT DOCUMENTS

| | | |
|---|---|---|
| CN | 1361409 A | 7/2002 |
| CN | 101067657 A | 11/2007 |
| CN | 101122637 A | 2/2008 |
| CN | 101178312 A | 5/2008 |
| CN | 101241011 A | 8/2008 |
| CN | 101702266 A | 5/2010 |

(Continued)

OTHER PUBLICATIONS

DARPA paper, "Urban Challenge—Route Network Definition File (RNDF) and Mission Data File (MDF) Formats," Defense Advanced Research Projects Agency (14 pages.

(Continued)

*Primary Examiner* — Isaac Smith
(74) *Attorney, Agent, or Firm* — Maginot Moore & Beck LLP (57) ABSTRACT

A localization system within a vehicle in one embodiment includes a global position system (GPS) receiver, a radar sensor, a data storage device including program instructions stored therein, a symbolic map stored within the data storage device, and a controller operatively coupled to the data storage device, the GPS receiver, and the radar sensor, the controller configured to execute the program instructions to analyze data from the GPS receiver, data from the radar sensor, and data from the stored symbolic map, and determine a probabilistic vehicle location based upon the analysis.

19 Claims, 4 Drawing Sheets

(56) References Cited

FOREIGN PATENT DOCUMENTS

| CN | 102099656 A | 6/2011 |
|---|---|---|
| CN | 202995036 U | 6/2013 |
| CN | 203037258 U | 7/2013 |
| EP | 2162849 B1 | 3/2014 |
| JP | 10300493 A | 11/1998 |
| JP | 2001124570 A | 5/2001 |
| JP | 2005257314 A | 9/2005 |
| JP | 2008293380 A | 12/2008 |
| JP | 2010519550 A | 6/2010 |
| JP | 2011511281 A | 4/2011 |
| WO | 2009098154 A1 | 8/2009 |

OTHER PUBLICATIONS

Langer et al., "Integrating Radar and Carrier Phase GPS for Classifying Roadway Obstacles," Proceedings of the IEEE Intelligent Transportation Systems Conference, Nov. 9-12, 1997, Boston, MA (6 pages).

Tian et al., "Spatially Aware Packet Routing for Mobile Ad Hoc Inter-Vehicle Radio Networks," IEEE, 2003, pp. 1-6, Germany (6 pages).

Yun et al., "Testing and Evaluation of an Integrated GPS/INS System for Small AUV Navigation," IEEE Journal of Oceanic Engineering, Jul. 1999, pp. 396-404, vol. 24, No. 3, USA (9 pages).

Zhou et al., "A Compact Positioning and Velocity RF Sensor for Improved Inertial Navigation," Department of Electrical and Computer Engineering, Carnegie Mellon University, Pittsburgh, PA (4 pages).

International Search Report and Written Opinion in corresponding PCT Application (i.e. PCT/US2012/040446), mailed Aug. 21, 2012 (10 pages).

English Translation of Chinese Search Report and Written Opinion corresponding to Chinese Application No. 201280027178.4, mailed Aug. 28, 2015 (7 pages).

Japanese Search Report and Written Opinion Corresponding to Japanese Application No. 2014-513742, mailed Mar. 24, 2016 (8 pages).

\* cited by examiner

COMBINED RADAR AND GPS LOCALIZATION SYSTEM

FIELD OF THE INVENTION

This invention relates to vehicle localization systems and more specifically to vehicle localization systems incorporating a global positioning system (GPS) receiver.

BACKGROUND

Vehicle location is used in a number of different systems for various purposes. In one common application, vehicular location is used in order to generate directions for an operator of the vehicle in order to navigate to a desired location. Generation of turn-by-turn directions in this type of application only requires a general location of the vehicle, the identified destination, and a symbolic map of roads which are available between the vehicle location and the destination.

Vehicle navigation systems commonly utilize a global positioning system (GPS) receiver which acquires one or more signals from one or more of a number of GPS satellites in order to accurately calculate the receiver position. The GPS receiver acquires and tracks signals consisting of carrier, pseudo random codes and modulated data from various satellites. The receiver correlates locally-generated codes with the codes received from the respective satellites to derive timing information relating the receiver time relative to the local generation of code chips to the satellite time at the times of the transmission of the corresponding code chips. The timing relationship between the receiver time and the transmission times of the various signals at the various satellites can be used in conjunction with the modulated data from the various satellites to generate a position of the receiver with respect to a reference frame shared with the satellites, for example, the earth centered earth fixed (ECEF) frame.

A basic GPS receiver can typically identify the location of the receiver within about 5 meters, which is sufficient for basic navigation applications which provide only turn-by-turn instructions. In some more precise navigation systems, the navigation system informs the driver of the actual lane in which the vehicle must be located in order to make an upcoming turn. A vehicular location accuracy of only 5 meters is inadequate for ascertaining whether or not a vehicle is in the appropriate lane for an upcoming turn.

Vehicle location data has also been incorporated into applications which provide collision avoidance. In some vehicle collision avoidance systems, the system determines the location of both the host vehicle and other vehicles within particular traffic lanes and determines collision probabilities based upon the lane-precise location of the vehicles. In this type of system, vehicular localization with an error of up to 5 meters is inadequate since a traffic lane typically has a width of less than about 4 meters.

In order to provide the more accurate vehicular location data needed both in vehicle collision avoidance systems as well as in more precise navigation systems, various alternatives have been investigated. One such alternative is referred to as a differential GPS system. In a differential GPS system, a group of receivers in an area are used to resolve the inaccuracies in the signal transmitted by the GPS satellites. A set of differential corrections for receivers in the particular area are then developed and used by the GPS receivers to correct their position solutions. Generally, a single differential correction factor will account for most errors in the GPS system, including receiver and/or satellite clock errors, variations in the positions of the satellite(s), and ionospheric and atmospheric delays. Vehicle location estimates using a differential GPS system can reduce errors to on the order of 2 meters. In multi-path environments (typical of dense urban areas), however, errors can be on the order of 50 meters.

Another alternative to the basic GPS system is map based localization. This approach allows localization of a vehicle relative to an image based map as discussed by Levinson, et al., "Map-Based Precision Vehicle Localization in Urban Environments," *Robotics: Science and Systems Conference,* 2007. This type of system uses a high resolution image of the road surface and allows for localization accuracies on the order of 10-25 cm. The sensors required by this type of system are scanning Light Detection and Ranging (LIDAR) sensors mounted on the roof the vehicle. This approach requires a vast amount of memory to store the required pre-recorded images and thus cannot be considered to be feasible for current vehicle systems.

Vision based localization systems have also been investigated. Vision based localization systems allow localization of a vehicle relative to a database of images mapped in a global coordinate frame. These systems use cameras as the primary sensor as reported by Konolige, et al., "View-Based Maps," *International Conference on Robotics and Systems* 2009, and Cummins et al., "Probabilistic appearance based navigation and loop closing," *International Conference on Robotics and Automation* 2007. Localization accuracies for these systems in large urban environments have not been reported.

In yet another approach, vision based lane detection systems which allow detection of the position of the vehicle relative to its current lane have also been developed. These systems are state-of-the-art in typical driver assistance systems. In this type of system, the position and course of the lane marking in front of the vehicle are detected. This information is used to warn the driver before the vehicle leaves the current lane (lane departure warning) or to keep the vehicle in the lane (lane keeping support). These systems typically only provide the vehicle position relative to the current lane.

What is needed therefor is a system that provides lane-precise localization on road ways. A system that does not require a high resolution image of the road, such as required by map based localization, or a database of images such as required by vision based localization, would be beneficial. A system which provides lane-precise localization while using only a symbolic map of roads and lanes would be further beneficial. Another benefit would be a system which exhibits accuracy and reliability even in dense urban environments and changing lighting conditions.

SUMMARY

A localization system within a vehicle in one embodiment includes a global position system (GPS) receiver, a radar sensor, a data storage device including program instructions stored therein, a symbolic map stored within the data storage device, and a controller operatively coupled to the data storage device, the GPS receiver, and the radar sensor, the controller configured to execute the program instructions to analyze data from the GPS receiver, data from the radar sensor, and data from the stored symbolic map, and determine a probabilistic vehicle location based upon the analysis.

In accordance with another embodiment, a method of localizing a vehicle includes determining a global position system (GPS) location, obtaining radar sensor data associated with a plurality of radar detected objects, defining a first possible vehicle location with reference to a symbolic map based on the determined GPS location, projecting a first location of the plurality of radar detected objects with reference to the symbolic map based on the first possible vehicle location, analyzing the projected first location of the plurality of radar detected objects, and determining a probabilistic vehicle location based upon the analysis of the projected first location.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 1:
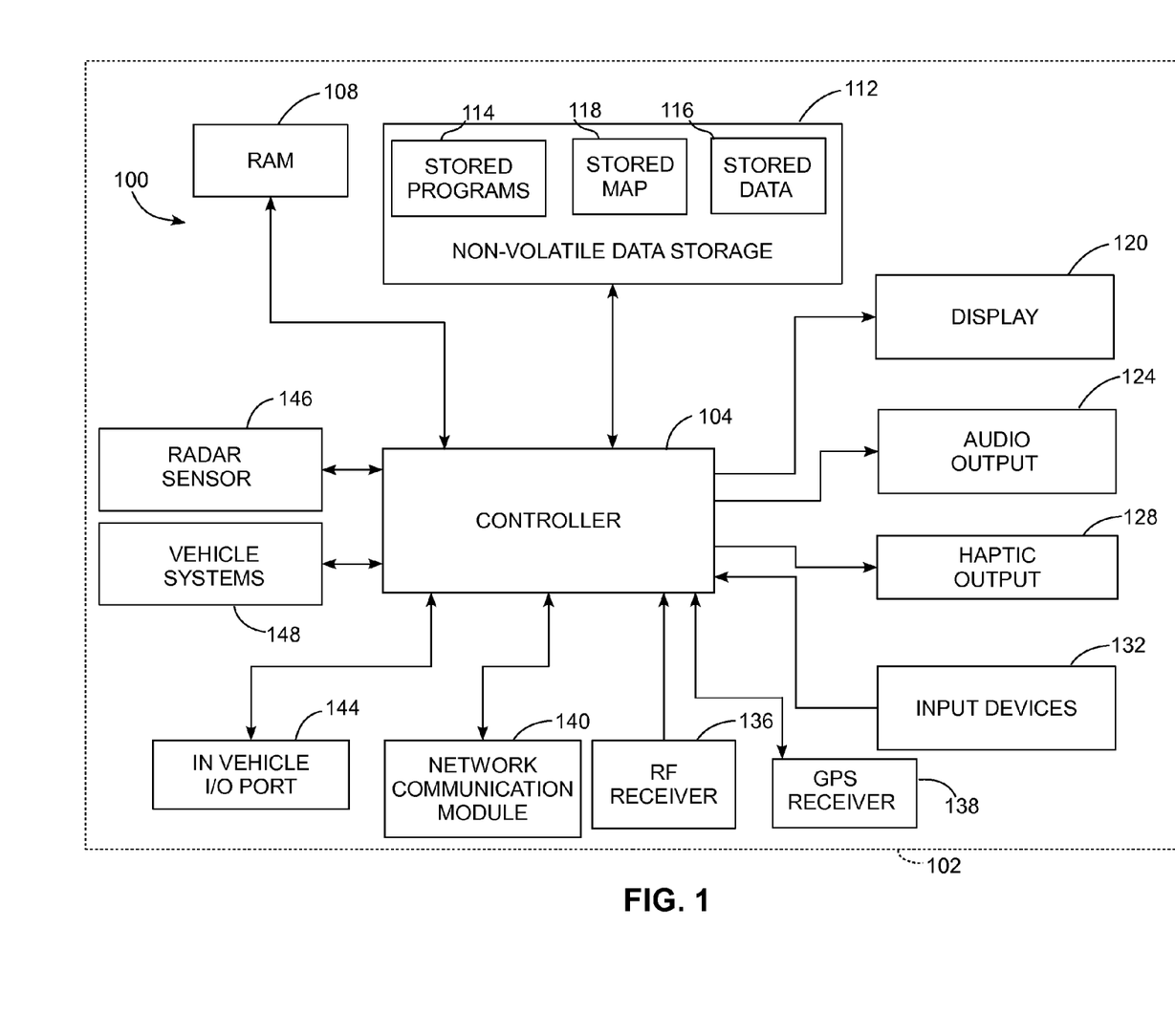
FIG. 1 depicts a schematic diagram of a vehicle localization system incorporating a stored symbolic map, a radar sensor, and a GPS receiver in accordance with principles of the invention.

FIG. 1 depicts a schematic diagram of a vehicle localization system 100 located in a vehicle 102. The localization system 100 includes a controller 104, random access memory (RAM) 108, non-volatile data storage device 112, display 120, audio output 124, haptic output 128, input devices 132, radio frequency (RF) receiver 136, global positioning system (GPS) receiver 138, network communication module 140, in vehicle input/output (I/O) port 144, radar sensor 146, and one or more vehicle systems 148.

The controller 104 is an electronic processing device such as a microcontroller, application specific integrated circuit (ASIC), field programmable gate array (FPGA), microprocessor including microprocessors from the x86 and ARM families, or any electronic device configured to perform the functions disclosed herein. Controller 104 may implement software and hardware functional units including a graphical processing unit (GPU) for generation of visual display data, as well as an audio digital signal processor (DSP) for generation of audible output signals. Controller 104 is configured to execute instructions corresponding to one or more software programs. While FIG. 1 depicts vehicle information system 100 using a single controller 104, various localization systems may use one or more controllers. Some or all of the functions provided by the data storage device 112, RAM 108, RF receiver 136, network communication module 140, in-vehicle I/O port 144, and vehicle systems 148 may be integrated with the controller 104 using either hardware or software in a system on a chip (SoC) configuration.

RAM 108 may be embodied by any memory device that enables controller 104 to load and store data from the memory device in a random access. Example embodiments include dynamic RAM (DRAM) and static RAM (SRAM). RAM 108 is operatively coupled to the controller 104 and controller 104 may load and store program instructions and data in the RAM 108. In a typical embodiment, RAM 108 is volatile, meaning that contents of the RAM 108 are erased in the absence of electric power.

Non-volatile data storage device 112 may be implemented as a hard drive, solid state drive, or as any digital storage device that is configured to retain data in the absence of externally supplied electrical power. Data storage device 112 is operatively coupled with the controller 104. Data storage device 112 reads stored data and provides the data to the controller 104, and writes data in response to a write command from the controller 104. The data storage device 112 is configured to hold one or more stored programs 114 and stored data 116. Stored programs or program instructions 114 include executable code to implement an operating system and one or more user space programs that execute within the operating system. Exemplary user space programs include web browsers and web servers.

The data storage device 112 further stores a symbolic map 118. The symbolic map 118 is a map which details the actual location of not only roads, but also of the lanes of the road. This is in contrast to many commonly available navigation maps which simply detail the location of an undivided road as a single line, and divided roads with two lines (one line for each direction). As such, each line on this type of map simply represents the center of the combined lanes in the represented road segment. The symbolic map 118 details the actual location of each lane of the road segment, typically by detailing the centerline of each lane. One example of such a symbolic map has been described in association with the Defense Advanced Research Projects Agency (DARPA) Urban Challenge. Details regarding the DARPA Urban Challenge, including a description of the symbolic map used in that challenge, can be obtained through the website at http://archive.darpa.mil/grandchallenge/index.asp. Accordingly, the term "symbolic map" as used herein means a map with lane-specific detail.

Stored data 116 include various data files for use by one or more stored programs in operation. The stored data 116 contain one or more sets of configuration data that define the format of user interfaces for the programs in the stored program data 114. The configuration data may include CSS and XSLT files that define rules for generating a user interface. One embodiment of data storage device 112 includes multiple data storage devices where one data storage device is fixedly installed in the vehicle 102 and holds the program instructions 114, while a second data storage device holding data is configured to be connected to and removed from the vehicle 102.

Display 120 includes at least one visual display device, such as a liquid crystal display (LCD), organic light-emitting diode (OLED) display, or projection device. Different vehicle configurations may include one or more display devices at various locations in the vehicle 102, including heads-up displays that project an image in front of the operator when operating the vehicle 102. The controller 104 is operatively coupled to the display device 120 and generates signals corresponding to text and graphics for display on or by the display device 120. The display device 120 converts the generated signals into visual output.

Audio output 124 typically includes one or more audio speakers that are operatively coupled to the controller 104. The audio output 124 may include various filters and amplifiers for processing of audio signals prior to output. The controller 104 generates one or more audio signals for the audio output 124, including audio and music received from the RF receiver 136 or held in stored data 116. Audio output 124 also emits sounds corresponding to synthetic speech signals that the controller 104 generates during operation.

Haptic output 128 includes one or more tactile feedback devices positioned in the vehicle 102 and operatively coupled to the controller 104. The haptic output 128 generates a feedback force that provides feedback to the operator of the vehicle 102. Common examples of haptic feedback devices include servos and actuators that are operatively coupled to the steering wheel, accelerator pedal, and brake pedal in an automobile. Various haptic devices may be placed on different control devices in different vehicles, including in the yoke of an aircraft and handlebars of a motorcycle. Various types of feedback force include vibration or a hysteresis force that resists movement applied by the operator.

Input devices 132 are configured to generate signals in response to a user action, and to provide the generated signals to the controller 104. Various types of input device 132 include, but are not limited to, buttons, knobs, dials, switches, sliders, keypads, touch-screen devices, and audio input devices. In particular, the display device 120 may include a touch screen interface that enables an operator to touch one or more sections of the display 120 to input commands. Audio output 124 may be coupled with an input device 132 in the form of a microphone that routes audible commands to the controller 104, and the controller 104 may implement a voice recognition system to identify the spoken commands. The controller 104 is configured to take one or more actions in response to receiving generated signals from the input devices 132. The controller 104 may take different actions for a signal generated by the same input device in response to the operating state of the information system 100 at the time the signal is generated. For example, a dial may be used to adjust the volume level of music when the controller 104 presents a music application to the operator, while the same dial may be used to adjust a temperature level for a climate control system in a different operating context.

RF receiver 136 is configured to receive radio frequency emissions using various modulation techniques on different frequencies. Common examples include analog AM and FM radio, terrestrial digital radio, satellite radio, as well as terrestrial and satellite video transmissions. The controller 104 may be configured to decode data received from the RF receiver 136 and to generate corresponding video and audio signals for the display 120 and audio output 124, respectively. In an alternative configuration, the RF receiver may generate signals for the display 120 and audio output 124 directly, and may provide metadata to the controller 104. Various forms of metadata include audio and video titles, artist information, play lengths, audio video bit rates, and other information that may be provided to the operator through display 120 and audio output 124.

GPS receiver 138 may be a commercially available GPS receiver which provides a nominal accuracy of about 10 meters or less. The GPS receiver 138 receives GPS signals for the purpose of determining the device's current location on Earth. The stored map 118 may be provided in the GPS receiver 138 in some embodiments. The GPS receiver 138 may provide suggested directions to the occupants of the vehicle 102 via the display 120 and/or the audio output 124.

Network communication module 140 is operatively coupled to the controller 104 and enables the controller 104 to send and receive data using one or more digital networks. In a typical embodiment, network communication module 140 implements a wireless networking protocol that enables the controller 104 to send and receive data using external data networks while the vehicle 102 is in operation. Examples of suitable wireless networks include 3G and 4G cellular data networks, satellite based communication networks, any suitable wireless wide area networks (WWANs), wireless local area networks (WLANs) including IEEE 802.11 wireless networks, and any wireless data transmission standard appropriate for use with the vehicle 102. Controller 104 may be configured to send and receive data packets using an Internet Protocol (IP) based protocol using, for example, either IP version 4 or IP version 6, common connection layer protocols including the Transport Control Protocol (TCP) and User Datagram Protocol (UDP), and a plurality of application level protocols. In particular, the controller 104 embodied in FIG. 1 is configured to send and receive data conforming to the Hyper Text Transport Protocol (HTTP) commonly used with the World Wide Web.

An input/output (I/O) port 144 is positioned within the vehicle and enables the controller 104 to send and receive data with one or more electronic devices that are in proximity to the vehicle. The I/O port 144 may be implemented as a wired connection using a standard connection type such as the Universal Serial Bus (USB) or various other wired connection standards. The I/O port 144 may also be a wireless port that enables communication with an electronic device through a wireless protocol including the 802.11 WLAN and Bluetooth protocols. The I/O port 144 and network communication module 140 may share common hardware components in some embodiments.

Various electronic devices may communicate with the controller 104 using the I/O port 144, including diagnostic equipment and electronic devices carried by the operator or occupant of the vehicle. In one embodiment, an occupant carries a handheld communication device such as a smart phone that includes communication hardware and software for communicating with the controller 104 using the I/O port 144. The localization system 100 may run web applications and retrieve configuration data provided by the electronic device.

The radar sensor 146 may be any desired radar sensor capable of generating data which can be used to determine a range and an instantaneous radial velocity of radar reflective surfaces within its field of view. While a radar with virtually any range and field of view may be used within the localization system 100, the localization system 100 may advantageously be used with known inexpensive sensors. In general, acceptable radars include automotive radar sensors with a range of around 200 meters and a field of view between 10 and 30 degrees.

One or more vehicle systems 148 are operatively coupled to the controller 104. The vehicle systems 148 may include one or more sensors and gauges in the vehicle. Common examples in an automobile include the speedometer, tachometer, fuel gauge, engine temperature gauge, tire pressure gauges, and the like. Controller 104 may also be configured to obtain error codes and diagnostic messages from an onboard diagnostic computer system, and in some embodiments the controller 104 may implement the function of the onboard diagnostic system. The controller 104 may identify trouble codes corresponding to an On-Board Diagnostics (OBD) protocol, and generate a plain-language visual or audio message corresponding to the trouble code. Other in-vehicle systems may include components having motors for automatic adjustment including an adjustable steering column, seats, gas and brake pedals, and mirrors. The controller 104 may be operatively coupled to the vehicle systems 148 using a Controller-area Network (CAN) communication bus, or other communication systems suitable for sending commands to vehicle components and for receiving data from different systems in the vehicle.

In operation, controller 104 obtains program instructions 114 from the data storage device and executes the program instructions 114 to determine a probabilistic vehicle location. A "probabilistic vehicle location" as that term is used herein is a location within an error envelope of a calculated GPS location which is most likely to be the actual vehicle location. One method for determining a probabilistic vehicle location is described with reference to FIG. 2.

Figure 2:
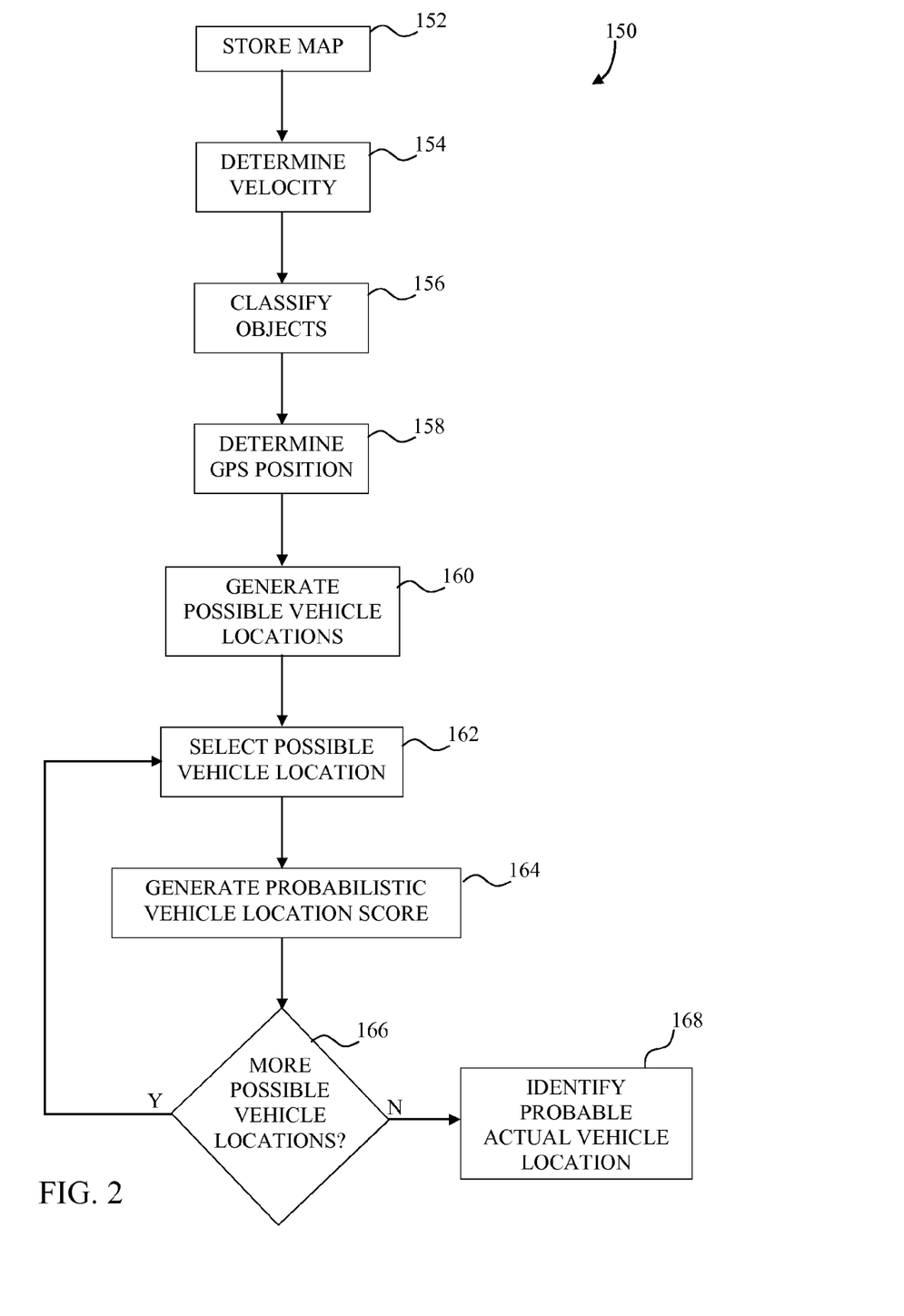
FIG. 2 depicts a flow diagram of a procedure that may be performed by the system of FIG. 1 to determine a probabilistic vehicle location to within a specific lane using a basic GPS receiver and a commercial off-the-shelf radar sensor.

FIG. 2 depicts a process 150 which begins with storing the symbolic map 118 within the non-volatile data storage 112 (block 152). The symbolic map 118 may be stored in a non-volatile data storage 112 provided with the vehicle or in a separately obtained non-volatile data storage 112, such as in a portable GPS receiver. The symbolic map 118 may be updated periodically, such as by using data obtained from the RF receiver 136 to provide updated lane data, such as temporary cross-over lanes established during construction.

At block 154, detected object data is obtained from the radar sensor 146. The controller 104 processes the radar detected object data to determine the velocity of each of the radar detected objects. In one embodiment, the absolute velocity of the radar detected objects is determined. The controller 104 may obtain data from the vehicle systems 148 to assist in determining the absolute velocity of radar detected objects. Vehicle systems which may be used for this purpose include on-board wheel odometry, steering wheel angle, IMU, etc. By cancelling out movement of the vehicle 102, absolute velocity of the radar detected objects with respect to a selected frame of reference, such as the frame of reference of the symbolic map 118, may be determined.

Once velocity for each of the radar detected objects has been determined, the detected objects are classified based upon the determined velocity (block 156). In one embodiment, the classification of detected objects is based upon a single speed threshold, such as 5 miles per hour (MPH), with detected objects above the threshold classified as dynamic obstacles and objects below the threshold classified as static objects. Static objects include signs, parked vehicles, fence posts, barriers, overpasses, and other non-moving objects which are often found alongside roads. Dynamic objects include other vehicles which are moving as well as non-vehicle objects moving above the speed threshold.

In some embodiments, multiple thresholds may be useful in better classifying the detected objects. By way of example, a detected object that is moving at 8 MPH may be a bicycle, a running pedestrian, a deer, or a motorized vehicle. A detected object that is moving at 45 MPH is almost certainly a motorized vehicle. Additional data, such as the strength of the detected radar signal, may be used to augment the velocity data in classifying a detected object. Thus, a detected object with a radar cross-section above a certain threshold may be classified as a motorized vehicle even when the detected object is moving at a very low speed.

At block 158, a GPS location for the vehicle 102 is determined and an error envelope is associated with the determined GPS location. The error envelope may be calculated based upon sensed conditions, or a default error envelope may be defined. The error envelope defines an area in which the vehicle 102 is located, about the determined GPS location, within a predetermined likelihood. In a simple example, an error envelope may be defined as a circle with a radius of 5 meters about the determined GPS location. In this example, there is 99.9% likelihood that the actual vehicle location is within the error envelope. In actuality, the error envelope for a moving vehicle will generally not be a circle since the in-track error will be greater than the cross-track error with all variables other than vehicle speed held constant.

Next, a list of possible vehicle locations within the error envelope is generated (block 160). The possible vehicle locations can be 1-dimensional, simply specifying a lateral offset (cross-track error) between the determined GPS position and the possible vehicle locations, or 2-dimensional, specifying both a lateral and longitudinal offset (in-track error) between the GPS position and the possible vehicle locations. The number of possible vehicle locations may be selected based upon a number of different criteria. As the desire for accuracy increases, the number of possible vehicle locations for a given error envelope may be increased. Similarly, for a given desired accuracy, as the size of the error envelope increases, the number of possible vehicle locations in the list may be increased. In one embodiment, a fixed number of possible vehicle locations are generated regardless of the error envelope size in order to maintain a desired computational speed.

At block 162, one of the possible vehicle locations is selected and an actual location probability or "probabilistic vehicle location score" is generated (block 164) for the selected possible vehicle location. The "probabilistic vehicle location score" is a measure of the likelihood that the selected possible vehicle location is the actual vehicle location. The probabilistic vehicle location score is determined using the determined GPS position, the radar data associated with the detected objects, and the symbolic map data as discussed more fully below. Next, the controller 104 determines if there are any possible vehicle locations that do not have a probabilistic vehicle location score (block 166). If there are possible vehicle locations that do not have a probabilistic vehicle location score, the process continues at block 162. If all of the possible vehicle locations have an associated probabilistic vehicle location score, the method 150 continues at block 168.

At block 168, the controller 104 analyzes the probabilistic vehicle location score associated with the possible vehicle locations. If one possible vehicle location has a probabilistic vehicle location score that is higher than the other probabilistic vehicle location scores, then that possible vehicle location is identified as the probable actual vehicle location. In the event that more than one possible vehicle location share the highest actual location probability, the controller may identify the center of the group of possible vehicle locations that share the highest actual location probability as the probable actual vehicle location. If desired, more complex analysis of the possible vehicle location scores may be used, such as the identification of a local maximum based upon all of the generated probabilistic vehicle location scores.

As noted above, the probabilistic vehicle location score for each possible location is generated using the determined GPS position, the radar data associated with the detected objects, and the symbolic map data. In one embodiment, the probability score is based upon an alignment score generated for each of the classifications of detected objects. In this embodiment, the selected vehicle position is defined with reference to the symbolic map 118 as described below.

Figure 3:
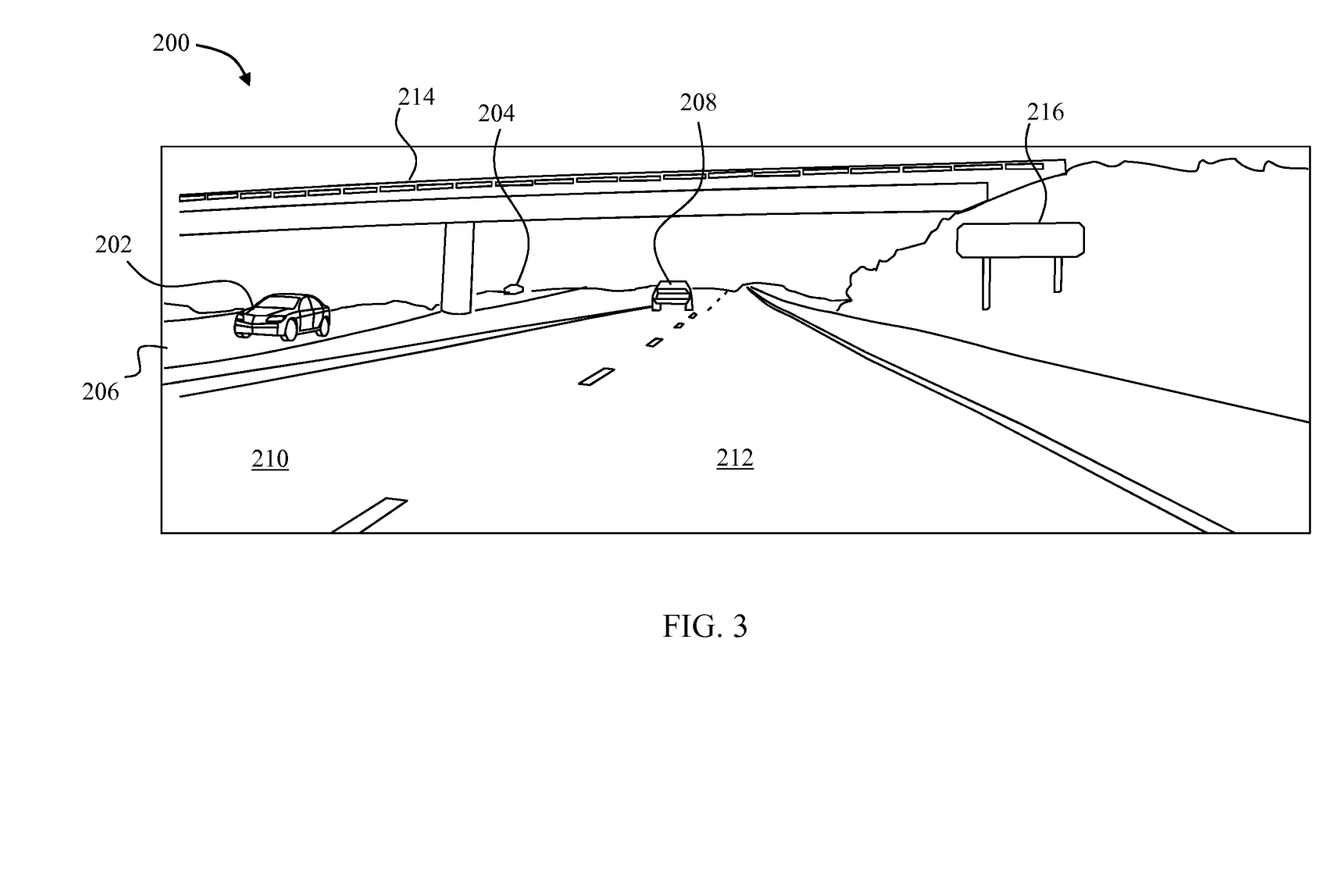
FIG. 3 depicts an exemplary perspective view from the vehicle of FIG. 1.

By way of example, FIG. 3 depicts a view 200 from the vehicle 102 at an exemplary time. In the view 200, two vehicles 202 and 204 are located in an oncoming lane 206 while another vehicle 208 is located in a lane 210 adjacent to a lane 212 in which the vehicle 102 is traveling. An overpass 214 and a road sign 216 are also depicted in the view 200. A depiction 220 of a symbolic map associated with the view 200 is provided in FIG. 4. The depiction 220 thus includes lane centerlines 222, 224, 226, 228, 230, and 232. The lane centerline 224 is associated with the lane 206 of FIG. 3, while the lane centerline 226 is associated with the lane 210 and the lane centerline 228 is associated with the lane 212.

Figure 4:
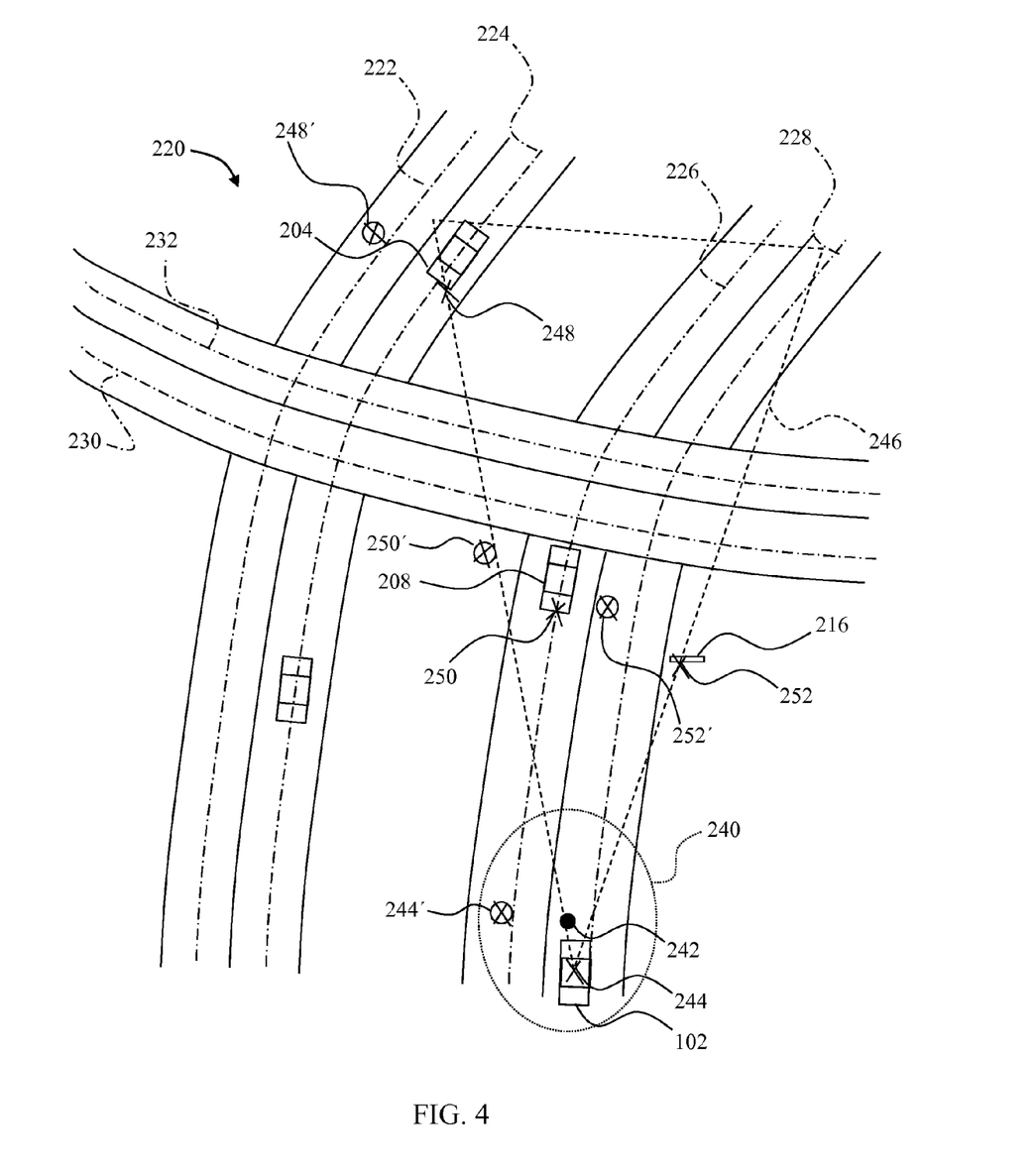
FIG. 4 depicts a schematic representation of the symbolic map of FIG. 1 with different possible vehicle locations and associated projected locations of detected objects.

Also shown in the depiction 220 is an error envelope 240 associated with a determined GPS location 242. The vehicle 102 is depicted in FIG. 4 at a selected vehicle position 244 within the error envelope 240 with a field of view 246 associated with the radar sensor 146. The selected vehicle position 244 is offset from the determined GPS location 242.

Once the selected vehicle position 244 is defined with reference to the symbolic map 118 as depicted in FIG. 4, the location of each of the radar detected objects is defined with reference to the symbolic map 118 using the relative position of each of the radar detected objects with respect to the selected vehicle position 244 based upon the radar data. This relative position is referred to herein as a "projected location" for the respective radar detected object. Thus, with reference to FIG. 4, the vehicle 204 is depicted at a projected location 248, the vehicle 208 is depicted at a projected location 250, and the road sign 216 is depicted at a projected location 252.

The projected location for a particular one of the detected objects will thus vary based upon the selected possible vehicle location. For example, FIG. 4 depicts a second selected vehicle position 244' which results in projected location 248', projected location 250', and projected location 252' for the vehicle 204, the vehicle 208, and the road sign 216, respectively. Accordingly, for one selected possible vehicle location (position 244), the projected location of a detected object may be in the center of a road lane (see, e.g., projected location 250), while for a second selected possible vehicle location (position 244') the projected location for the same detected object may be 30 feet away from the center of the nearest road lane (see, e.g., projected location 250').

Recalling that at block 156 of the process 150 the velocity of the radar detected objects was used to classify the radar detected objects, the classification of the radar detected objects is then used to generate a reasonableness score for the projected location. Accordingly, if the detected object is moving at 60 MPH, then the detected object is most likely a vehicle. Thus, a selected possible vehicle location (position 244) that results in a projected location for a dynamic radar detected object near the center of a road lane (projected location 250) is more likely to be the actual vehicle location than a selected possible vehicle location (position 244') that results in a projected location for the dynamic radar detected object farther away from the center of a road lane (projected location 250').

Consequently, an algorithm may be incorporated into the stored data 116 or the program instructions 114 wherein selected vehicle positions which result in projected positions for dynamic detected objects closer to a center of a lane are scored higher than selected vehicle positions which result in projected positions for dynamic detected objects farther from a center of a lane. Thus, the position 244 would have a higher score than the position 244' based solely on the projected locations 250 and 250' while the position 244 would have about the same score as the position 244' based solely on the projected locations 248 and 248', both of which are about the same distance away from a lane center, albeit two different lane centers 224 and 222, respectively.

Similarly, selected vehicle positions which result in projected positions for static detected objects farther from a center of a lane may be scored higher than selected vehicle positions which result in projected positions for static detected objects closer to a center of a lane (see, e.g., projected locations 250 and 250').

The complexity of the algorithm may be increased to provide increased fidelity. For example, by tracking a detected object over multiple iterations, the detected object may be better classified. Thus, an object which has previously been classified as dynamic, may retain a "dynamic" classification even when it stops, e.g., a vehicle which stops at a stop light. Accordingly, a stopped vehicle previously classified as a dynamic object which is close to a center of a lane may be scored as high as a presently moving dynamic object that is just as close to a center of a lane.

The foregoing scores are referred to herein as "alignment scores" and are generated for each detected object at each possible vehicle location. In general, the alignment scores provide, for each selected vehicle position, a quantitative means of comparing how well the radar detected objects are positioned with respect to the center of traffic lanes based upon the classification of the radar detected objects, in comparison to other selected vehicle positions. The alignment scores in an embodiment which classifies detected objects simply as "dynamic" and "static" may be represented using the following:

$$P(d \mid l) = e^{-\frac{dist(d,lane)^2}{2\lambda^2}} \text{ and } P(s \mid l) = 1 - e^{-\frac{dist(s,lane)^2}{2\lambda^2}}$$

wherein P(d|l) is the dynamic object alignment score for a specific dynamic object (d) for the selected possible vehicle location (l) that is the being evaluated, "dist(d, lane)" is the distance between the detected dynamic object location and the center of the nearest lane, where the dynamic object location is defined using the relative location of the detected object from the vehicle based upon the radar data (the "projected position"), and the lane location is based upon the symbolic map, P(s|l) is the static object alignment score for a specific detected static object (s) for the selected possible vehicle location (l) that is the being evaluated, and "dist(s, lane)" is the distance between the projected position of the detected static object location and the center of the nearest lane.

Once an alignment score has been generated for all of the detected objects for the selected possible vehicle location, a probability score for the selected possible vehicle location is generated based upon the alignment scores for each detected object according to the following equation:

$$P(R \mid l) = \prod_S P(s \mid l) \prod_D P(d \mid l)$$

wherein "R" is the observed radar measurements.

Once the probability score for the selected possible vehicle location has been generated based upon the alignment scores, a probabilistic vehicle location score can be generated using both the alignment score based probability score and the GPS data in accordance with the following:

$$P(l \mid R, g) = \frac{P(R \mid l, g)P(l \mid g)}{Z} = \frac{P(R \mid l)P(l \mid g)}{Z}$$

$$\text{wherein } "Z = \sum_{L} P(R \mid l)P(l \mid g)"$$

is a normalizing constant, and

"g" is the determined GPS location.

To provide stability and decrease noise these scores are filtered over time so that $P(l_{t+1}) = \alpha P(l_t) + (1-\alpha)P(l \mid R_{t+1}, g_{t+1})$ where $0 \leq \alpha \leq 1$. This provides a smooth estimate of vehicle location. To estimate the location of the vehicle at time t (probabilistic vehicle location) one simply reports the location with the highest $P(l_t)$.

Therefore, the probabilistic vehicle location identifies the location of the vehicle with a precision such that even when the vehicle is in a multi-lane road, the particular lane in which the vehicle is located will be identified. This accuracy is achieved by generating the probability scores using the determined GPS position, the radar data associated with the detected objects, and the symbolic map data.

Once the probable actual vehicle location has been determined, the vehicle localization system 100 may use the probable actual vehicle location with one or more of the functions provided by the vehicle localization system 100. For example, the probable actual vehicle location may be used to provide lane-specific navigation instructions. Thus, if the vehicle 102 is not in the proper lane for making an upcoming turn, the audio output 124 may be used to give an audio warning to the vehicle operator to change lanes.

In vehicles including a lane departure warning system, the probable actual vehicle location may be used to prioritize or modify a lane departure warning. For example, when a vehicle is determined to be leaving a lane in a direction toward another traffic lane associated with travel in the same direction as the presently occupied lane, a mild warning may be given to the operator. When leaving a lane in a direction toward a non-lane area or a traffic lane associated with travel in the opposite direction as the presently occupied lane, a heightened warning may be generated.

The probable actual vehicle location may further be used to optimize adaptive cruise control systems. For example, the probable actual vehicle location may be combined with radar observations to more accurately determine the position of other vehicles relative to the road map. This allows an adaptive cruised control to determine which lane of the road other vehicles are occupying and thus improve the prediction of their current and future positions allowing for improved performance.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A localization system within a vehicle comprising:
   a global position system (GPS) receiver;
   a radar sensor;
   a data storage device including program instructions stored therein;
   a symbolic map stored within the data storage device; and
   a controller operatively coupled to the data storage device, the GPS receiver, and the radar sensor, the controller configured to execute the program instructions to
   analyze data from the GPS receiver, data from the radar sensor, and data from the stored symbolic map, and determine a probabilistic vehicle location based upon the analysis,
   wherein the symbolic map comprises a map with lane-specific detail, and
   the probabilistic vehicle location is a location within an error envelope of a calculated GPS location which is most likely to be the actual vehicle location.

2. The system of claim 1, wherein analyzing the data from the GPS receiver, data from the radar sensor, and data from the stored symbolic map comprises:
   generating a list of possible vehicle locations based upon the data from the GPS receiver, and determining a probabilistic vehicle location comprises:
   estimating, for each of the possible vehicle locations, an actual location probability.

3. The system of claim 2, wherein analyzing the data from the GPS receiver, data from the radar sensor, and data from the stored symbolic map comprises:
   determining a velocity for each of a plurality of objects detected by the radar; and
   classifying each of the plurality of objects detected by the radar based upon the determined velocity.

4. The system of claim 3, wherein classifying each of the plurality of objects comprises:
   classifying each of the plurality of objects detected by the radar based upon the determined velocity as static or dynamic.

5. The system of claim 4, wherein determining a probabilistic vehicle location comprises:
   determining, for each of the possible vehicle locations, a respective dynamic object alignment score for each of the plurality of objects classified as dynamic; and
   determining, for each of the possible vehicle locations, a respective static object alignment score for each of the plurality of objects classified as static.

6. The system of claim 5, wherein:
   the respective dynamic object alignment score is based upon a projected location of a respective one of the plurality of objects classified as dynamic with respect to a first presumed center of a lane; and
   the respective static object alignment score is based upon a projected location of a respective one of the plurality of objects classified as static with respect to a second presumed center of a lane.

7. The system of claim 3, wherein determining a probabilistic vehicle location comprises:
   determining, for each of the possible vehicle locations, a respective object alignment score for each of the plurality of objects.

8. The system of claim 7, wherein:
   the respective object alignment score is based upon a projected location of a respective one of the plurality of objects with respect to a presumed center of a lane.

9. The system of claim 1, wherein the controller is further configured to execute the program instructions to generate a lane-specific navigation instruction based upon the determined probabilistic vehicle location.

10. The system of claim 1, wherein the controller is further configured to execute the program instructions to generate a lane-specific lane departure warning based upon the determined probabilistic vehicle location.

11. The system of claim 1, wherein the controller is further configured to execute the program instructions to generate an adaptive cruise instruction based upon the determined probabilistic vehicle location.

12. A method of localizing a vehicle comprising:
   determining a global position system (GPS) location;
   obtaining radar sensor data associated with a plurality of radar detected objects;
   defining a first possible vehicle location with reference to a symbolic map based on the determined GPS location;
   projecting a first location of the plurality of radar detected objects with reference to the symbolic map based on the first possible vehicle location;
   analyzing the projected first location of the plurality of radar detected objects; and
   determining a probabilistic vehicle location based upon the analysis of the projected first location, wherein
   the symbolic map comprises a map with lane-specific detail, and
   the probabilistic vehicle location is a location within an error envelope of a calculated GPS location which is most likely to be the actual vehicle location.

13. The method of claim 12, further comprising:
   defining a second possible vehicle location with reference to the symbolic map based on the determined GPS location;
   projecting a second location of the plurality of radar detected objects with reference to the symbolic map based on the second possible vehicle location;
   analyzing the projected second location of the plurality of radar detected objects; and
   determining the probabilistic vehicle location based upon the analysis of the projected second location.

14. The method of claim 13, further comprising:
   determining a velocity for each of the plurality of radar detected objects; and
   classifying each of the plurality of radar detected objects based upon the determined velocity.

15. The method of claim 14, wherein classifying each of the plurality of radar detected objects comprises:
   classifying each of the plurality of radar detected objects based upon the determined velocity as static or dynamic.

16. The method of claim 15, wherein determining the probabilistic vehicle location based upon the analysis of the projected first location comprises:
   determining a respective dynamic object alignment score for each of the plurality of radar detected objects classified as dynamic; and
   determining a respective static object alignment score for each of the plurality of radar detected objects classified as static.

17. The method of claim 16, wherein:
   the respective dynamic object alignment score is based upon a projected location of a respective one of the plurality of radar detected objects classified as dynamic with respect to a first presumed center of a lane; and
   the respective static object alignment score is based upon a projected location of a respective one of the plurality of radar detected objects classified as static with respect to a second presumed center of a lane.

18. The method of claim 14, wherein determining the probabilistic vehicle location based upon the analysis of the projected first location comprises:
   determining a respective object alignment score for each of the plurality of radar detected objects.

19. The method of claim 18, wherein:
   the respective object alignment score is based upon a projected location of the respective one of the plurality of radar detected objects with respect to a presumed center of a lane.

* * * * *